June 16, 1925.
W. H. ROBINSON
1,542,175
GREENHOUSE FUMIGATING LAMP
Filed Dec. 13, 1923
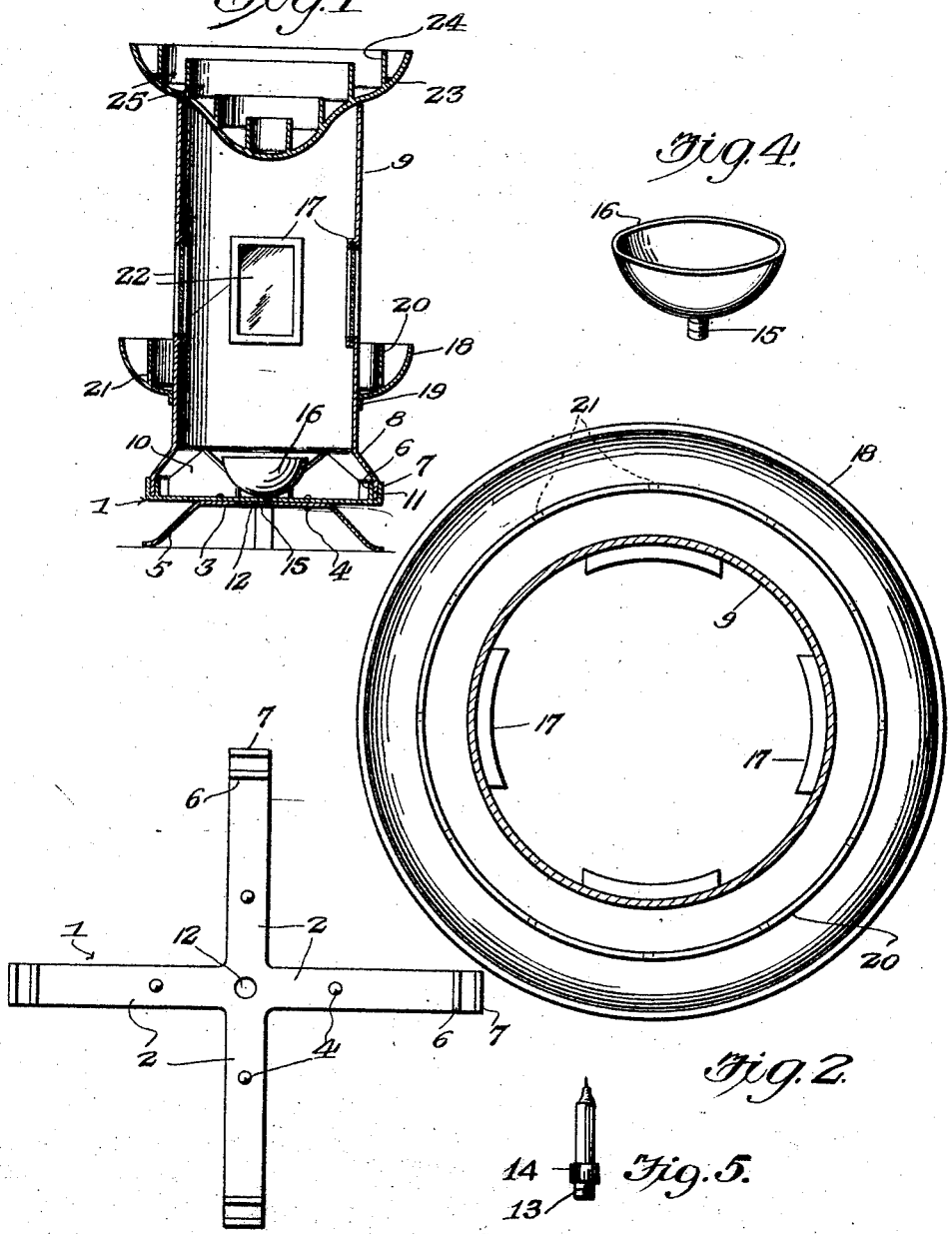
William H. Robinson INVENTOR,
His ATTORNEY.

Patented June 16, 1925.

1,542,175

UNITED STATES PATENT OFFICE.

WILLIAM H. ROBINSON, OF MORTON GROVE, ILLINOIS.

GREENHOUSE FUMIGATING LAMP.

Application filed December 13, 1923. Serial No. 680,572.

*To all whom it may concern:*

Be it known that WILLIAM H. ROBINSON, a citizen of the United States of America, residing at Morton Grove, in the county of Cook and State of Illinois, has invented new and useful Improvements in Greenhouse Fumigating Lamps, of which the following is a specification.

Greenhouses, as a rule, are frequented by various insects or pests, such as flying moths, commonly called "leaf rollers," which roll up in rose leaves, hatching worms and destroying foliage on various plants.

It is, therefore, the purpose of the present invention to provide, in a fumigating lamp, a construction used for fumigating and exterminating such insects, and with this end in view, the lamp includes a lamp body with means for supporting a candle on the interior of the body which is provided with openings to permit the light from the candle to appear therethrough for the purpose of attracting the insects which fall in a water trough surrounding the body.

Another purpose is to provide a fumigating lamp wherein a bowl is supported upon the body of the lamp for the reception of tobacco and nicotine fumigating material in the form of a powder, in conjunction with a support at the base of the lamp for supporting an alcohol cup, the heat from which burns the fumigating material or powder for the purpose of exterminating or destroying the insects or pests which are detrimental to plant life. It is obvious that when burning the fumigating powder or material, the light from the burning alcohol appears through the transparent covered openings and thereby acts to also attract the insects which will fall in the water trough.

Still another purpose is the provision of means carried by the bowl which permits the fumigating powder or material to be equally distributed throughout the entire surface of the bowl though the bowl is concaved as shown.

A further purpose is to provide a lamp body with openings near the bottom to insure the required air draft to cause the alcohol to burn properly and also to direct the flame upwardly through the body.

A still further purpose is the provision of suitable means at the base of the lamp and on which the body of the lamp is detachably supported, said means being also constructed to support either a candle holder or an alcohol cup.

In providing a device of the present character for carrying out the foregoing purposes, it is the aim to provide a construction affording the double-fold purpose of fumigating and at the same time attracting the insects to the lamp whereby they may fall in the water of the water trough surrounding the body of the lamp.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in section of the improved greenhouse fumigating lamp constructed in accordance with the invention and showing the same as being used for burning fumigating material or powder.

Figure 2 is a horizontal sectional view of the structure of Figure 1 taken just above the plane of the light openings.

Figure 3 is a top plan view of the base.

Figure 4 is a detail perspective view illustrating the alcohol container.

Figure 5 is a detail elevational view illustrating a mantle and support serviceable for alternative use with the alcohol container.

Referring to the drawings, 1 designates a base which is in the form of a spider comprising four radial arms 2, said base also including a second spider 3 which is riveted at 4 to the first spider, the second spider having downwardly and outwardly depending legs 5 whereby the base may be supported as shown in Figure 1.

The arms 2 of the spider 1 have their outer ends terminating in upstanding lugs or extensions 6 and 7, properly spaced for the reception of the lower flared margin 8 of the body 9 (which may be any suitable shape, preferably cylindrical, and any suitable proportions) of the lamp.

The lower flared margin of the body 9 is provided with a plurality of diametrically opposite V-shaped openings 10 which cause flared legs 11 to be formed at the bottom of the lamp body. These legs, which constitute the margin of the body 9, engage between the upstanding lugs 6 and 7, so that the body of the lamp may be properly supported.

The center of the base is provided with an opening 12 which may receive either the threaded shank 13 of the candle holder 14 or the threaded shank 15 of the alcohol cup or container 16. In either case, the shank is to be threaded in the opening to support that which is integral therewith. If the holder 14 is used for holding or supporting a candle, the flying insects are attracted due to the light appearing through the openings 17, so that the insects may fall in the water trough 18. This water trough is in surrounding relation to the body 9 of the lamp and secured thereto in any suitable manner, as shown at 19.

The trough has an upstanding annular division wall 20 which divides the water trough into two compartments. However, these compartments are in communication due to the openings 21 and when the flying insects or pests are attracted by the light through the openings 17, they strike the wall of the lamp and drop in one or the other of the compartments of the trough. In this way, certain of the insects are destroyed.

The openings 10 are provided for the purpose of permitting a draft to pass through the body of the lamp to insure proper burning of the alcohol, that is, when the cup 16 is used for such purpose.

The body of the lamp at diametrically opposite portions is provided with sheets of transparent material 22, such as isinglass or the like, for covering the opening 17. By this material, light is shown through the transparent covered openings and acts to attract the insects or pests which fall in the water trough where they may drown.

A suitable bowl 23 is provided for the reception of fumigating material, preferably tobacco and nicotine fumigating substance, which when burned acts to fumigate the greenhouse and also exterminate the various insects or pests, especially the "leaf rollers" which roll up in rose leaves, hatching worms which, in turn, destroy foliage on the plants. This bowl is concaved, as shown, and fits upon and within the body of the lamp.

In order to distribute the fumigating material or powder throughout the full area of the bowl, the interior of the bowl is provided with annular upstanding divisions, walls or flanges 24 which cause annular troughs 25 to be formed. The fumigating powder or material is sprinkled in the various troughs from the center of the bowl to the outer perimeter thereof. Obviously, the powder or material is thoroughly distributed so that all particles thereof may readily burn and be consumed.

Should the bowl be made without these upstanding walls or flanges, the majority of the powder would lie in the center of the bowl, in which case the powder or material would not properly perform the functions of fumigating and exterminating the insects. However, when the powder or material is thinly scattered or distributed as above set forth, it will evenly burn and thereby properly fumigate.

In using the device, the base is placed in position in the greenhouse at any suitable location and the candle holder 14 is mounted on the base, after which the lamp body 9 is placed upon the base, as shown in Figure 1, with the trough full of water. The candle is then lighted and due to the fact of the light appearing through the openings 17, the insects or bugs are attracted and permitted to fall in the water in the trough. The candle is used preferably every night during the summer months for catching and destroying the flying moths or other insects.

However, the burning of fumigating powder or material is accomplished about once a week. In this case, the base is placed in position, then the cup 16 is mounted upon the base and the lamp body placed in position with the powder or fumigating material container engaged with the upper end of the body, whereby the downwardly protruding part of the bowl or container enters the body of the lamp. In this way, the heat from the burning alcohol in the cup rises and applies against the under surface of the bowl, thereby thoroughly burning and evenly consuming the fumigating powder or material.

The invention having been set forth, what is claimed is:

1. In a greenhouse fumigating lamp, a base having lateral arms, a lamp body operatively supported upon the arms, a container operatively supported upon the base for the reception of alcohol to be burned, and a bowl operatively supported upon the upper end of the body for the reception of fumigating material or powder, said bowl having annular channels for the reception of fumigating material which evenly burns.

2. In a greenhouse fumigating lamp, a lamp body, a container for the reception of alcohol to be burned, and a bowl supported on the upper end of the body and above the container, said bowl having a plurality of annular channels for the reception of fumigating material, said channels being arranged one above the other and having their centers in the same vertical line.

3. In a greenhouse fumigating lamp, a lamp body, a container for the reception of alcohol to be burned and a bowl supported on the upper end of the body and above the container, said bowl having a plurality of superposed annular channels of gradually increasing diameter.

In testimony whereof he affixes his signature.

WILLIAM H. ROBINSON.